J. J. ROBY.
MINE CAR WHEEL AND BEARING.
APPLICATION FILED MAR. 9, 1914.
1,173,218.
Patented Feb. 29, 1916.
2 SHEETS—SHEET 1.
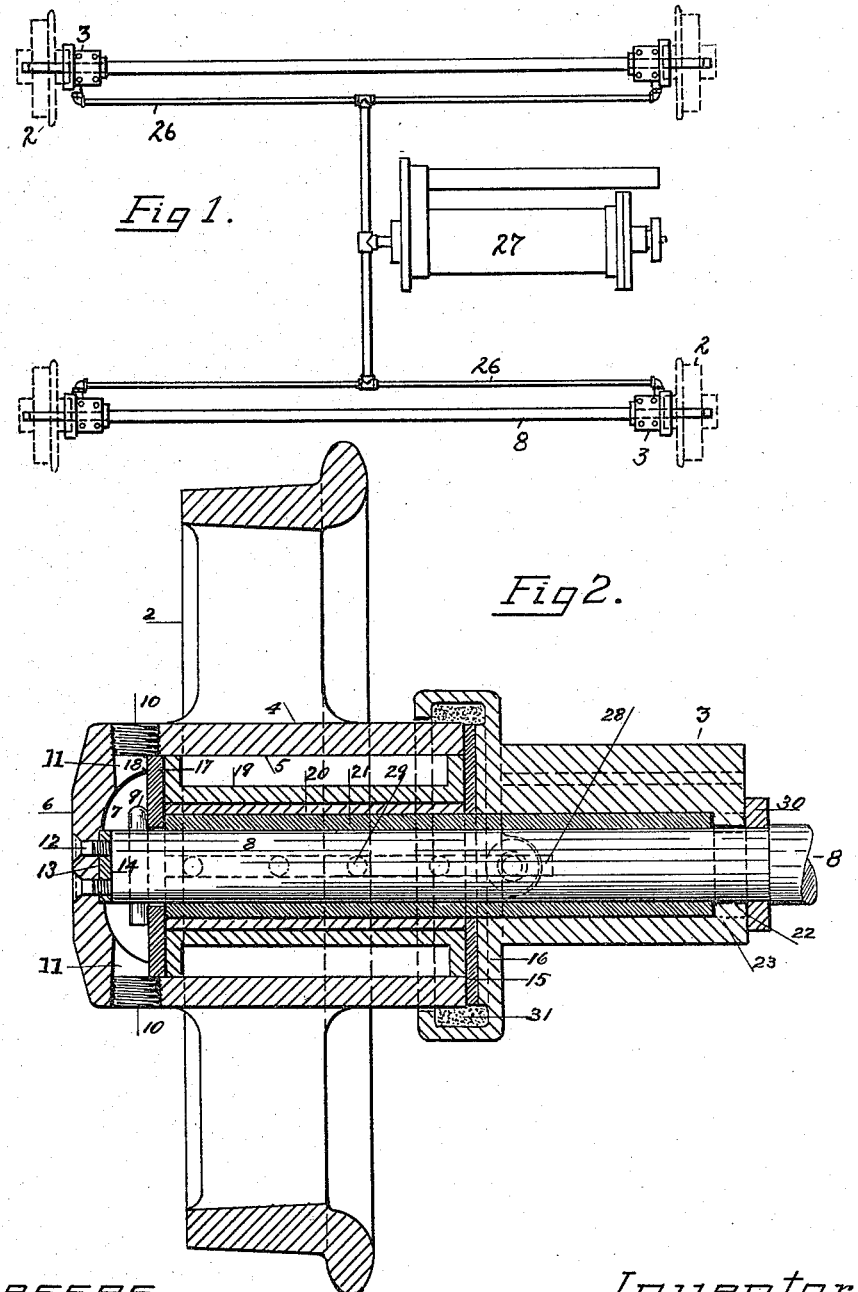
Witnesses.
Inventor.
James J. Roby
Fisher & Moser
Att'ys

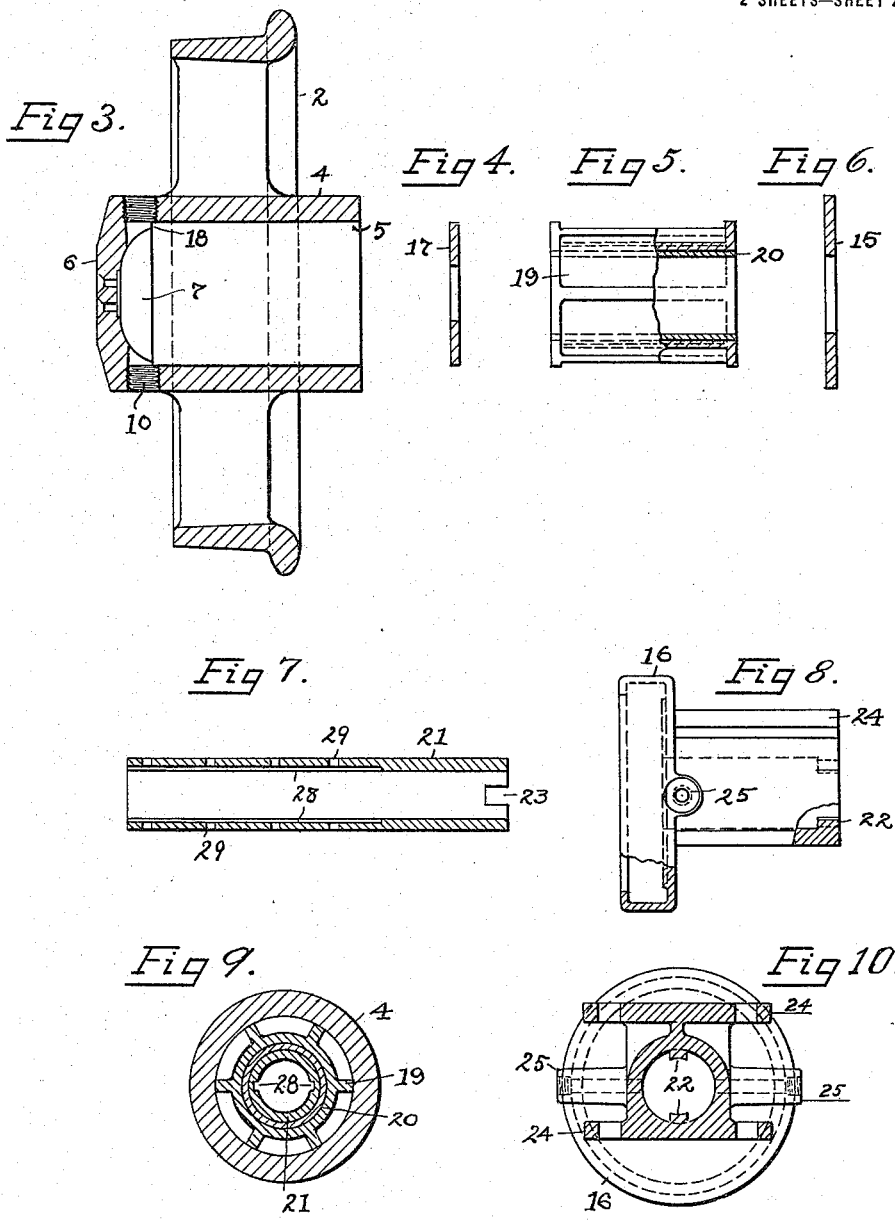

UNITED STATES PATENT OFFICE.

JAMES J. ROBY, OF CLEVELAND, OHIO.

MINE-CAR WHEEL AND BEARING.

1,173,218. Specification of Letters Patent. Patented Feb. 29, 1916.

Application filed March 9, 1914. Serial No. 823,285.

*To all whom it may concern:*

Be it known that I, JAMES J. ROBY, citizen of the United States, residing at Cleveland, in the county of Cuyahoga and State of Ohio, have invented certain new and useful Improvements in Mine-Car Wheels and Bearings, of which the following is a specification.

This invention relates to a mine car wheel and bearing, and the invention comprises the improved construction and arrangement of parts substantially as herein shown and described and more particularly pointed out in the claims.

The primary object of the invention is to provide a wheel and bearing for mine cars which is particularly constructed to permit lubrication thereof from a distant source or supply of lubricant, and a further object is to provide a bearing with wearing parts capable of being removed and replaced and also differently related in order that the life of the wheel and bearing may be prolonged and repairs easily made.

In the accompanying drawings, Figure 1 is a diagram showing four wheels and bearings having pipe connections leading to a cylinder containing a supply of lubricant. Fig. 2 is a vertical section centrally through a wheel and its box or bearing mounted on a portion of a shaft or axle. Figs. 3, 4, 5 and 6 are separate sectional views of the wheel and its washers and bushing. Fig. 7 is a sectional view of the bearing sleeve or extension, and Fig. 8 a side view partly broken away of the box alone. Figs. 9 and 10 are cross sections of the wheel hub and the box respectively.

The wheels of mine cars are usually free to revolve on the shaft or axle and the wear is greatest on the wheel hub and axle, and the practice is to discard the wheel when worn at its bearing and to provide new axles. Except for its bearing, the wheel is otherwise in a perfectly good condition. It is also the practice to supply each wheel of the car independently with a lubricant whenever any single wheel may require such attention. However, it is a common occurrence to find one or more wheels of the car without a lubricant and the bearings badly worn in consequence. I find that this situation may be overcome to a great extent by providing means for feeding a lubricant to all the bearings and wheels from a common source of supply and by uniformly maintaining the feed for each and all of the wheels for a protracted period. With that end in view, I construct the flanged wheel 2 and its bearing or box 3 in a particular way, the wheel 2 being provided with a hub 4 having a relatively large cylindrical bore 5 which is open at one end and closed at its outer projecting end 6. A reduced chamber 7 within end 6 confines the outer end of the shaft or axle 8 and its cotter pin 9, and a set of openings 11 in the hub give access to the cotter pin 9 when the screw plugs 10 are removed. The side movement of the wheel is limited by the cotter pin and by a bronze disk or plate 13 fastened by screws 12 upon the inside of the hub end 6 opposite the flat end face 14 of the shaft or axle 8. Disk 14 is easily removed and substituted by another when worn and its contact area is relatively small as compared with the area of the washer generally used for the same purpose, and which washer is located at the opposite end of the hub and corresponds to the washer 15 in the present invention within the chambered enlargement 16 of box 3. Cotter pin 9 engages a washer 17 which is firmly clamped against a shoulder 18 within the hub by means of a spider or ribbed bushing 19 driven and fitting tightly within bore 5. Bushing 19 is bushed or lined upon its inside with bronze or other good wearing metal 20, and the rotatable contact of the wheel is borne by lining 20 and the tubular extension 21 of box 3. This extension is removably secured to box 3 but is fixed and prevented from revolving with the wheel and within the box by integral lugs 22 at one end of the box which project into notches 23 at the corresponding end of the tubular extension 21. Box 3 is secured through ears 24 by bolts or other means to the frame of the car, and the wheel 2 revolves freely on the tubular extension 21 which relieves the axle or shaft 8 from all wear caused by the rotation of the wheel; and the main body of the box and the wheel are also subjected to little or no wear and are therefore durable and lasting. Removal of bushing 19 from hub 4 is easily accomplished and the bushing may then be relined with little expense, and it is also a simple and inexpensive matter to substitute a new tubular extension 21 for one that is worn. This extension wears principally on its under side, and when so worn may be slipped out of box 3 and given a half-turn and then again inserted into locked relations with the box, thereby placing the former bottom wearing side of the extension on top and bringing the more perfect and unworn side at the bottom where the load is carried. Sleeve extension 21 also has a further function,—that of serving as a conveyer for the lubricant which is introduced through either one of the two centrally drilled bosses 25 at the sides of box 3. Pipes 26 are connected to one or both of said bosses and a single grease cylinder 27 is mounted upon the car in feeding communication with said pipe.

Any suitable mechanism may be employed to produce a forced feed of the grease or other lubricant from the cylinder. The operation of this mechanism may be either manually or mechanically controlled. The lubricant flows through the bosses 25 of box 3 and enters an opening or openings in the side of the sleeve or tubular extension 21 and passes forwardly through the longitudinal channels 28 which are formed upon the inside of said extension, and a series of holes 29 permit the lubricant to escape through the extension and thereby reach the bearing surface of the inner lining 20. The channels 28 also extend to the extreme outer end of the extension and are open to chamber 7 so that the lubricant is also constantly present in this chamber to lubricate the end bearing surface 14 of plate 11. Two channels 28 are provided, one at either side of the extension, so that communication between the channel and the bore of a boss 25 may always be established regardless of the double setting of the extension which is afforded by the lugs 22 and notches 23 as hereinbefore described. A collar 30 fixed on the axle or shaft bears against the side of box 3 and prevents end movement of the shaft in that direction, and the enlargement 16 of the box has an annular channel within which a suitable packing material 31 may be placed to make the joint at this point leak and dust proof.

One of the advantages of the present invention is that some types of mine car wheels now in use may be continued in use when the bearings become worn by the substitution or interchange of the present bushing 19 for the bearing parts therein, particularly in that type of car wheel having removable roller bearings in a hub provided with a bore of corresponding diameter to the present device.

What I claim is:

1. A car wheel having a chambered hub with a closed end and an internal shoulder adjacent thereto, a bearing washer removably seated within said hub against said shoulder and a bushing removably seated within said hub and bearing against said washer.

2. A car wheel having a hub with a closed chamber at its end and a removable bushing, in combination with a box having a tubular extension removably mounted thereon and projecting into said bushing, a shaft projected through said extension, and means within said end chamber to secure said wheel against outward movement on the shaft.

3. A car wheel having a hollow hub with a closed end, a thrust plate detachably secured upon the inside of said end, and a removable bushing within said hub, in combination with a box having a removable bearing extension adapted to enter said bushing, a shaft projected through said extension into bearing relations with said thrust plate, and locking means to secure said wheel upon said shaft.

4. A wheel having a hollow hub, an apertured washer within one end of said hub, a removable bushing having a ribbed surface in seating engagement with the hub and clamping said washer in place, and an inner lining for said bushing having an internal diameter exceeding the aperture in said washer.

5. A car wheel having a removable bushing, in combination with a box having a bore provided with radial lugs, and a tubular extension having a slotted end removably seated within said bore and engaged with said lugs.

In testimony whereof I affix my signature in presence of two witnesses.

JAMES J. ROBY.

Witnesses:
R. B. MOSER,
F. C. HARROLD.

Copies of this patent may be obtained for five cents each, by addressing the "Commissioner of Patents, Washington, D. C."